US008825850B2

(12) United States Patent
Agatsuma et al.

(10) Patent No.: US 8,825,850 B2
(45) Date of Patent: Sep. 2, 2014

(54) INFORMATION PROCESSING APPARATUS AND CONTROL METHOD

(75) Inventors: Harutoshi Agatsuma, Kawasaki (JP);
Takuya Fujiwara, Kawasaki (JP);
Atsushi Amari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 13/485,200

(22) Filed: May 31, 2012

(65) Prior Publication Data

US 2012/0239806 A1    Sep. 20, 2012

Related U.S. Application Data

(63) Continuation of application No. PCT/JP2009/070765, filed on Dec. 11, 2009.

(51) Int. Cl.
*G06F 15/173* (2006.01)
*H04L 29/08* (2006.01)

(52) U.S. Cl.
CPC .................................. *H04L 67/303* (2013.01)
USPC .................................. 709/224; 709/223

(58) Field of Classification Search
USPC ............................................... 709/223–224
See application file for complete search history.

(56) References Cited

U.S. PATENT DOCUMENTS

| | | | | |
|---|---|---|---|---|
| 6,742,059 B1 * | 5/2004 | Todd et al. ....................... 710/19 |
| 7,899,900 B1 * | 3/2011 | Motoyama ..................... 709/224 |
| 2003/0158932 A1 * | 8/2003 | Machida et al. ............... 709/224 |
| 2006/0168195 A1 * | 7/2006 | Maturana et al. ............. 709/224 |
| 2007/0168486 A1 * | 7/2007 | McCoy et al. ................. 709/223 |
| 2008/0109295 A1 * | 5/2008 | McConochie et al. .......... 705/10 |
| 2009/0027331 A1 * | 1/2009 | Kim et al. ...................... 345/156 |
| 2009/0204686 A1 * | 8/2009 | Yoda et al. ..................... 709/218 |
| 2009/0204710 A1 * | 8/2009 | Wada ............................. 709/225 |
| 2011/0106978 A1 * | 5/2011 | Shishido et al. .................. 710/3 |

FOREIGN PATENT DOCUMENTS

| | | | | |
|---|---|---|---|---|
| JP | 3-268048 | 11/1991 | | |
| JP | 2000-194583 | 7/2000 | | |
| JP | 2001-243165 | 9/2001 | | |
| JP | 2002-189641 | 7/2002 | | |
| JP | 2002-194583 | 7/2002 | | |
| JP | 2004-178371 | 6/2004 | | |
| JP | 2004178371 A * | 6/2004 | ............ | G05B 23/02 |
| JP | 2004-318572 | 11/2004 | | |

OTHER PUBLICATIONS

Office Action mailed Jun. 4, 2013 in corresponding Japanese Patent Application No. 2011-545035.

(Continued)

*Primary Examiner* — Waseem Ashraf
(74) *Attorney, Agent, or Firm* — Staas & Halsey LLP

(57) ABSTRACT

An information processing apparatus coupled to a plurality of terminal devices through a communication channel, the information processing apparatus includes a communication unit configured to communicate with the plurality of terminal devices, an apparatus information obtaining unit configured to obtain apparatus information indicating a state of the information processing apparatus, and an information transmission controller which includes an information storage unit configured to store the apparatus information received from the apparatus information obtaining unit.

8 Claims, 5 Drawing Sheets

(56) References Cited

OTHER PUBLICATIONS

Written Opinion of the International Searching Authority mailed Mar. 9, 2010 (English Translation mailed Jul. 19, 2012) issued in corresponding International Patent Application No. PCT/JP2009/070765.

International Preliminary Report on Patentability mailed Jun. 21, 2012 issued in corresponding International Patent Application No. PCT/JP2009/070765.

International Search Report for PCT/JP2009/070765 mailed Mar. 9, 2010.

* cited by examiner

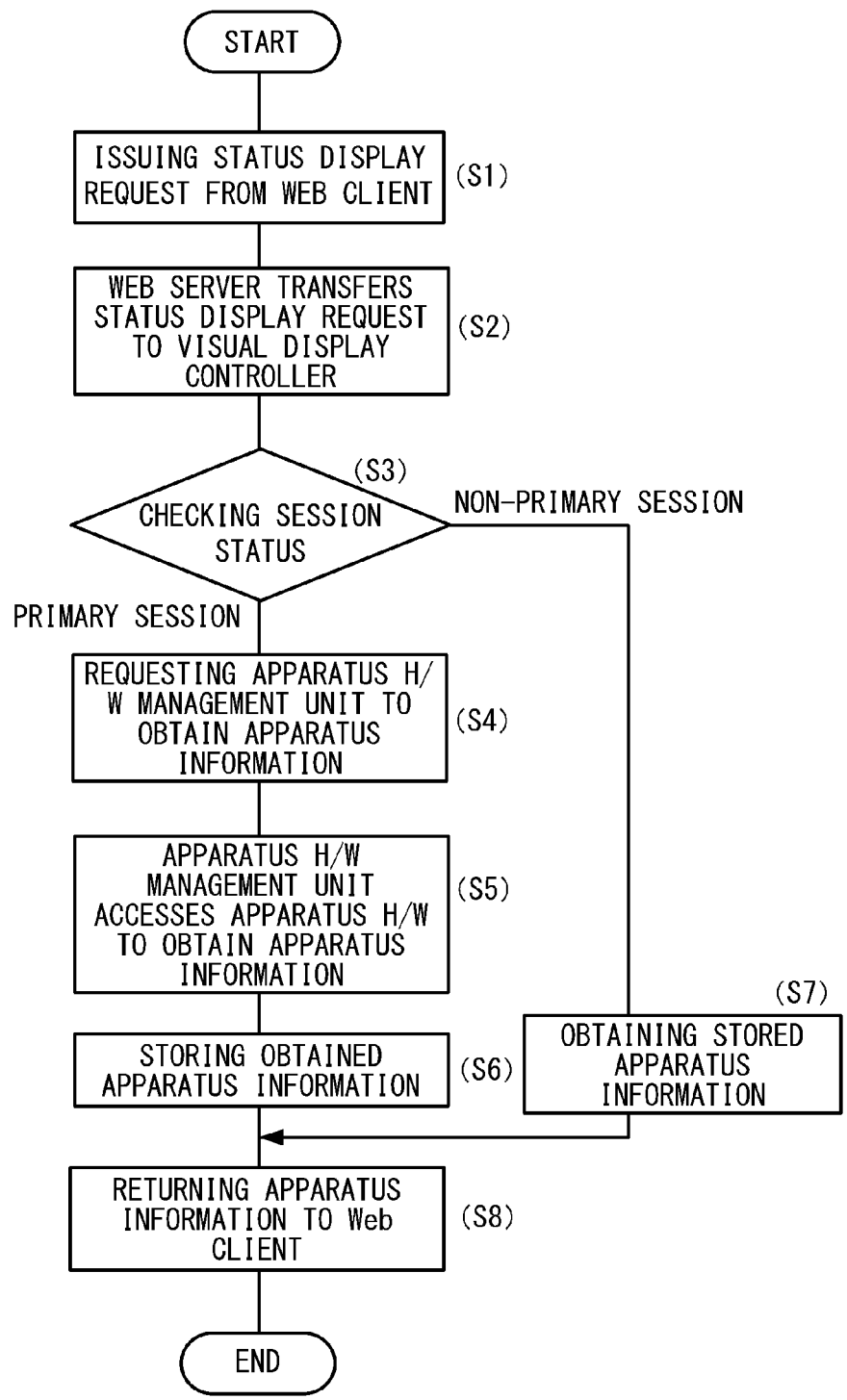
F I G. 3

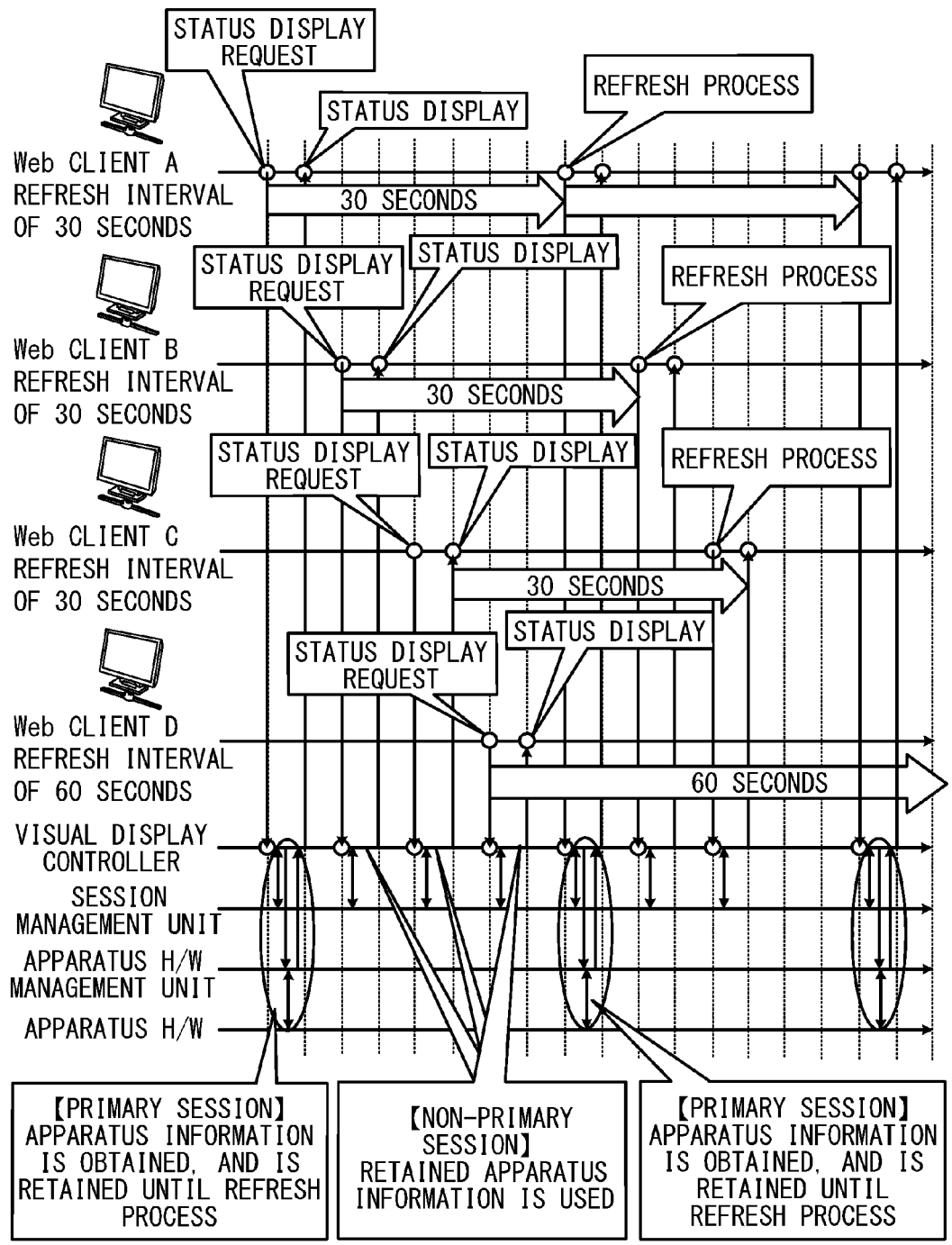
F I G. 4

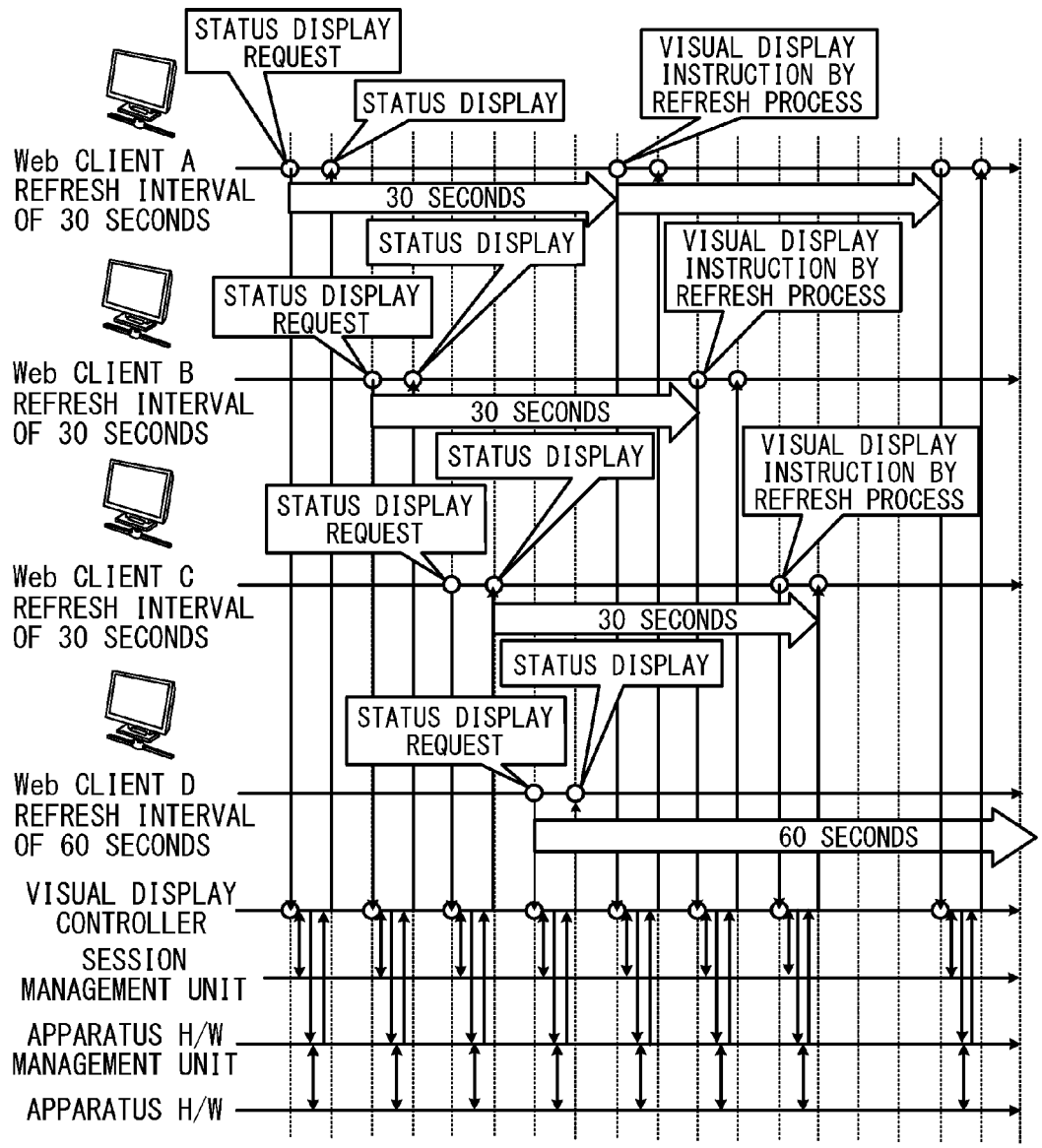
F I G. 5

INFORMATION PROCESSING APPARATUS AND CONTROL METHOD

CROSS-REFERENCE TO RELATED APPLICATIONS

This application is a continuation application of International PCT Application No. PCT/JP2009/070765, filed on Dec. 11, 2009, the entire contents of which are incorporated herein by reference.

FIELD

The embodiments discussed herein are related to an information processing apparatus and a control method.

BACKGROUND

Client devices as terminal devices, which cause the server device to perform an original task, for example a deposit and withdrawal processing task at banks, are connected to a server device as an information processing apparatus, and the server performs the original task. To such a server device, not only a client device that performs its original task but also a system-controlling client device as a system-controlling terminal device are connected. That server device obtains apparatus information consisting of the status of the sensor of each unit in the server device or the like in response to a request from a system-controlling client, and transmits the obtained apparatus information to a system-controlling client device. The apparatus information is displayed at the system-controlling client device, and the apparatus information is used by an operator for monitoring whether the server device is operating normally. As the status of the server device changes from moment to moment, the system-controlling client device transmits a new request to the server device at constant intervals (for example, at intervals of 30 seconds), and obtains new apparatus information from the server device to update the display.

Here, there are some cases where several system-controlling client devices are connected to a single server device. In such cases, the load for collecting apparatus information increases; for example, the server device needs to obtain the status of the sensor of each unit in the server device in response to the requests from the several client devices. If an attempt is made to reduce the load, inconvenience is caused; for example, the number of system-controlling client devices that can be simultaneously connected is limited.

A technique has been proposed in which when an event occurs to one of a plurality of terminal devices as a plurality of client devices that are connected to the server device through the network as a communication path, that event is reflected on all the terminal devices. This technique has been developed such that the display format will be the same among the terminal devices. Moreover, a technique in which the same information is simultaneously displayed on the terminal devices with different formats has been proposed.

Patent Document 1: Japanese Laid-open Patent Publication No. 2001-243165
Patent Document 2: Japanese Laid-open Patent Publication No. 03-268048

SUMMARY

According to an aspect of the invention, an information processing apparatus coupled to a plurality of terminal devices through a communication channel, the information processing apparatus includes a communication unit configured to communicate with the plurality of terminal devices, an apparatus information obtaining unit configured to obtain apparatus information indicating a state of the information processing apparatus, and an information transmission controller which includes an information storage unit configured to store the apparatus information received from the apparatus information obtaining unit, wherein, when the communication unit receives a first information transmission request repeatedly transmitted from a first terminal device which transmitted the first information transmission request for requesting transmission of the apparatus information displayed on a first state monitoring screen among the plurality of terminal devices, the information transmission controller requests the apparatus information obtaining unit to obtain the apparatus information corresponding to the first information transmission request, receives the apparatus information from the apparatus information obtaining unit, stores the obtained apparatus information in the information storage unit, and controls the communication unit to transmit the apparatus information to the first terminal device, and after the communication unit receives the first information transmission request transmitted by another terminal device other than the first terminal device among the plurality of terminal devices, the information transmission controller controls the communication unit to transmit the apparatus information corresponding to the first information transmission request stored in the information storage unit to the another terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating the processes performed by the server device of FIG. 2;

FIG. 4 is a timing chart illustrating the operation of the server device of FIGS. 2 and 3; and FIG. 5 is a timing chart illustrating the operation of a server device as a comparative example.

DESCRIPTION OF EMBODIMENTS

Some embodiments of the present application will be described below.

Figure 1:
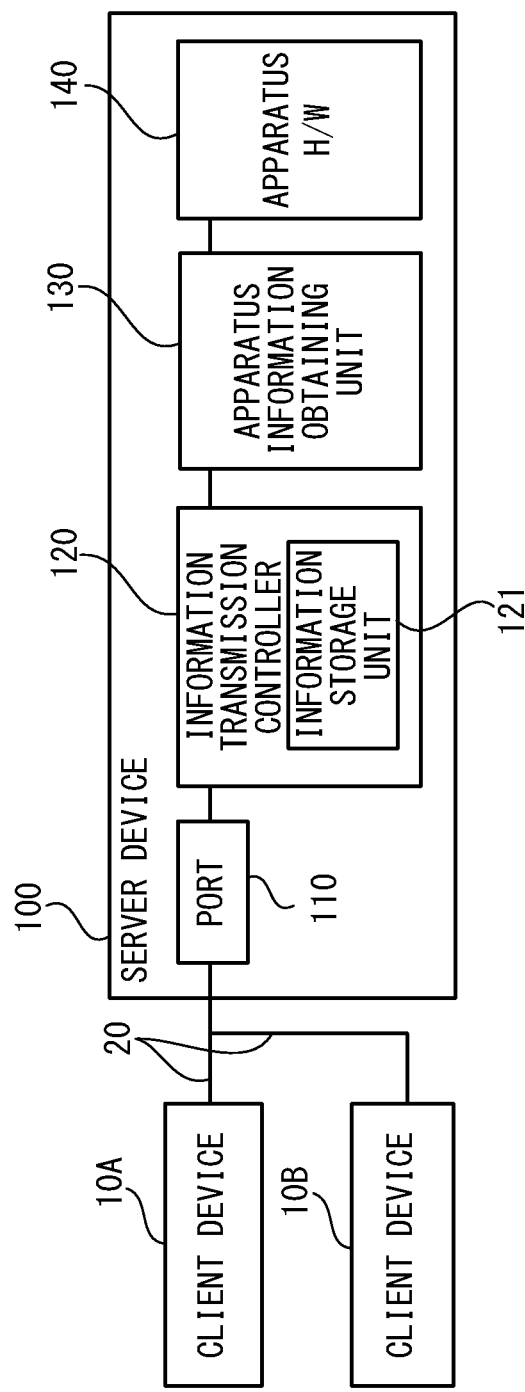
FIG. 1 is a diagram illustrating a server device according to the first embodiment of the present application.

FIG. 1 is a diagram illustrating a server device as an information processing apparatus according to the first embodiment of the application.

A server device 100 is connected to a plurality of (herein, two) client devices 10A and 10B through a communication channel 20. The communication channel 20 is, for example, a network such as a LAN (Local Area Network). The number of the client devices connected to the server device 100 is not limited to two, but may be three or more. The server device 100 includes a port 110 as a communication unit, an information transmission controller 120, an apparatus information obtaining unit 130, and an apparatus H/W (hardware unit) 140. The apparatus H/W 140 is illustrated as one block in FIG. 1, but the apparatus H/W 140 may be widely distributed to several parts of the server device 100, and may include, for example, a temperature sensor, a fan rotation speed sensor, a voltage sensor, a current sensor, or other types of various sensors. Moreover, the information transmission controller 120 includes an information storage unit 121 that stores apparatus information, as will be described later.

The apparatus information obtaining unit 130 collects and obtains the apparatus information containing measurement information or several types of hardware information collected by sensors from the apparatus H/W 140 that is widely distributed to several parts of the server device 100 as above.

The port 110 is a communication interface such as a LAN card that performs communication between the client devices 10A and 10B.

The information transmission controller 120 is placed between the port 110 and the apparatus information obtaining unit 130. The information transmission controller 120 includes the information storage unit 121 in which the apparatus information received from the apparatus information obtaining unit 130 is stored. When the port 110 receives an information transmission request from one of the client devices 10A and 10B, the information transmission controller 120 controls the port 110 to transmit the apparatus information corresponding to the information transmission request. The port 110 transmits the apparatus information corresponding to the information transmission request to the client device that transmitted the information transmission request.

Here, the client devices 10A and 10B transmit the information transmission request, which is a request for transmission of the apparatus information displayed first on a state monitoring screen for monitoring the system or state of the server device 100, to the server device 100 at constant intervals (for example, at intervals of 30 seconds).

Here, it is assumed that the client device 10A transmits the first information transmission request at an earlier timing than the client device 10B. Here, only the information transmission request transmitted from the client device 10A will be described. When the information transmission request transmitted from the client device 10A is received at the port 110, the information transmission controller 120 requests the apparatus information obtaining unit 130 to obtain the apparatus information, thereby obtaining the apparatus information from the apparatus information obtaining unit 130. The information transmission controller 120 stores the obtained apparatus information in the information storage unit 121, and controls the port 110 to transmit the apparatus information to the client device 10A. When the apparatus information is stored in the information storage unit 121, in cases where the apparatus information displayed on the same state monitoring screen exists in the information storage unit 121, new apparatus information is stored instead of that apparatus information by performing a overwriting or the like. When a next information transmission request is transmitted from the client device 10A, in a similar manner, the information transmission controller 120 requests that the apparatus information obtaining unit 130 obtains the apparatus information again, thereby obtaining the apparatus information from the apparatus information obtaining unit 130 again. The information transmission controller 120 stores the re-obtained apparatus information in the information storage unit 121, and controls the port 110 to transmit the re-obtained apparatus information to the client device 10A. By repeating the processes described above, a state displaying screen in which the apparatus information is stored is displayed on the client device 10A, and the apparatus information in the state displaying screen is updated at constant intervals (for example, at intervals of 30 seconds).

Here, the client device 10B also repeatedly transmits the apparatus-information transmission request, which is a request for transmission of the same apparatus information as the client device 10A requested, to the server device 100 at constant intervals (for example, at intervals of 30 seconds). Once the information transmission request from the client device 10B is received at the port 110, the information transmission controller 120 refers to the information storage unit 121. In the information storage unit 121, the apparatus information obtained when the immediately preceding information obtainment request from the client device 10A was received is stored. Then, the information transmission controller 120 reads the apparatus information stored in the information storage unit 121 without newly obtaining the apparatus information containing the status of the sensor of each unit in the server device or the like, and controls the port 110 to transmit the apparatus information to the client device 10B. As described above, every time the information transmission request is received, the apparatus information stored in the information storage unit 121 is transmitted from the port 110 to the client device 10B without newly obtaining the apparatus information containing the status of the sensor of each unit in the server device or the like. Accordingly, in a similar manner as the client device 10A, the apparatus information updated at constant intervals (for example, at intervals of 30 seconds) is displayed on the state monitoring screen of the client device 10B.

As described above, according to the server device 100 of FIG. 1, the apparatus information is newly obtained in response to the request from the client device 10A. On the other hand, the apparatus information is not newly obtained in response to the request from the client device 10B, and the stored apparatus information is transmitted. In this case, the process of obtaining the apparatus information is reduced by one-half compared with the case in which the apparatus information is newly obtained for all the information transmission requests from both of the client devices 10A and 10B. Accordingly, the load for obtaining the apparatus information is reduced.

Figure 2:
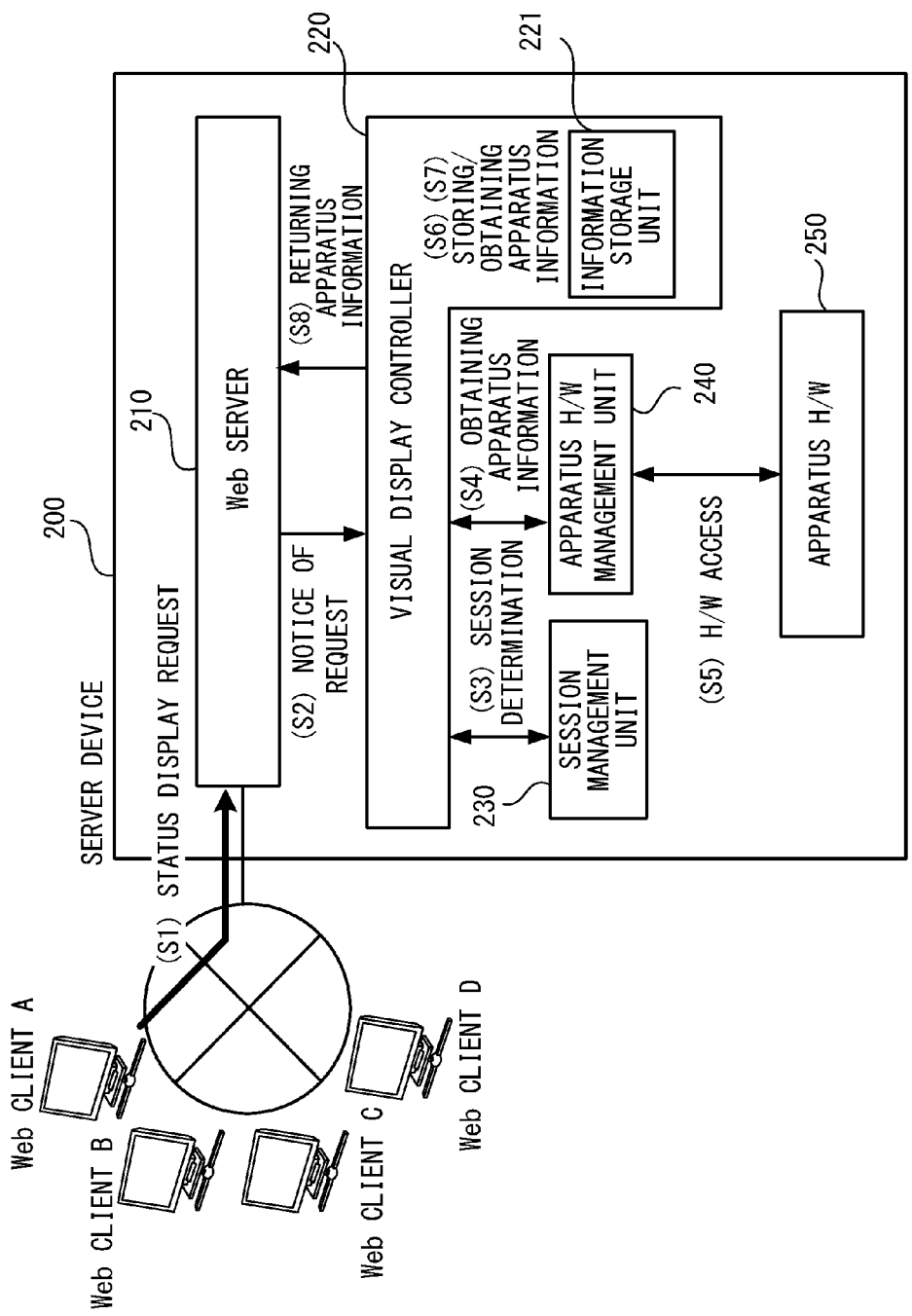
FIG. 2 is a diagram illustrating a server device according to the second embodiment of the present application.

FIG. 2 is a diagram illustrating a server device according to the second embodiment of the present application.

Four client devices (Web clients A to D) are connected to a server device 200 through a communication channel such as a LAN. The server device 200 includes a Web server 210, a visual display controller 220, a session management unit 230, an apparatus H/W management unit 240, and an apparatus H/W 250. When the configuration of FIG. 2 is compared with the first embodiment of FIG. 1, the Web server 210 corresponds to the port 110, and the combination of the visual display controller 220 and the session management unit 230 corresponds to the information transmission controller 120. In particular, the Web server 210 is a service function realized by HTTP (Hyper Text Transfer Protocol). Moreover, the information storage unit 221 in the visual display controller 220 corresponds to the information storage unit 121. Furthermore, the apparatus H/W 250 corresponds to the apparatus H/W 140.

In the session management unit 230, the information that specifies the screen being displayed on each of the Web clients A-D, and the information for the same screens that specifies the client device on which the screen is displayed first (this will be referred to as a "primary session") are stored. The visual display controller 220 can recognize the screen that is being displayed on the each Web clients A-D and which of the Web clients A-D is responsible for a primary session by referring to the session management unit 230.

The differences between the server device 200 of FIG. 2 and the server device 100 of FIG. 1 are described above, and the operations of the Web server 210, the apparatus H/W management unit 240, and the apparatus H/W 250 are the same as the operations of the port 110, the apparatus information obtaining unit 130, and the apparatus H/W 140 of the server device 100 of FIG. 1. In other words, the Web server 210 is responsible for the communication with the Web clients A-D. The apparatus H/W management unit 240 accesses the apparatus H/W 250 to obtain the apparatus information that indicates the status of the server device 200. The apparatus H/W 250 includes several types of sensors, and in response to the access from the apparatus H/W management unit 240, the apparatus H/W 250 makes the apparatus H/W management unit 240 obtain the measurement information collected by those sensors and the apparatus information composed of the information on the hardware that constitutes the server device 200.

FIG. 3 is a flowchart illustrating the processes performed by the server device 200 of FIG. 2.

When a status display request is issued by one of the Web clients A-D and the Web server 210 receives the status display request (S1), the Web server 210 transfers the status display request to the visual display controller 220 (S2).

Here, the "status display request" corresponds to the "information transmission request" received at the server device 100 according to the first embodiment of FIG. 1. Regarding the term "status display request", the fact that a state displaying screen in which the apparatus information is stored is displayed on each of the Web clients is taken into consideration.

Next, the visual display controller 220 makes an inquiry to the session management unit 230 to determine whether or not the Web client that has transmitted the presently-received status display request is a primary session in which the state monitoring screen corresponding to that status display request is displayed first (S3). When it is determined that the Web client is a primary session, the visual display controller 220 requests the apparatus H/W management unit 240 to obtain the apparatus information (S4). The apparatus H/W management unit 240 accesses the apparatus H/W 250 to obtain the apparatus information that indicates the status of the server device, and passes the obtained apparatus information to the visual display controller 220 (S5). The visual display controller 220 converts the obtained apparatus information into the screen information that indicates a screen on which the apparatus information is displayed, and retains the apparatus information that has been converted into the screen information in the information storage unit 221 (S6).

Next, the apparatus information is returned to the Web client responsible for the primary session that has presently transmitted the status display request (S8).

When the Web client is determined to be a non-primary session in step S3, the apparatus information stored in the information storage unit 221 is obtained (S7), and the obtained apparatus information is returned to the Web client for the non-primary session that has presently transmitted the screen display request (S8).

Here, when a status display request for another state monitoring screen is transmitted from the Web client that is responsible for the primary session, the information of the primary session about the previous state monitoring screen, which was stored in the session management unit 230 of FIG. 2 previously, is reset. Then, when a next status display request for that state displaying screen is transmitted, the Web client that transmitted the status display request is recorded by the session management unit 230 as a new primary session.

FIG. 4 is a timing chart illustrating the operation of the server device of FIGS. 2 and 3.

Here, the three Web clients A-C out of the four Web clients A-D transmit new status display requests for every refresh interval of 30 seconds, and the remaining one Web client D transmits a new status display request for every refresh interval of 60 seconds. Moreover, here, the same state displaying screen on which the entire apparatus information of the server device 200 is recorded is displayed on the four Web clients A-D as an initial screen. Here, it is assumed that the Web client A initially transmits a status display request for the state displaying screen, and that the status display request is received at the server device 200. In other words, here, the Web client A is responsible for the primary session.

In this case, in response to the status display request transmitted from the Web client A, the apparatus H/W is accessed by the apparatus H/W management unit, and the apparatus information is newly obtained. In response to the status display requests transmitted from the other Web clients B-D, the apparatus H/W is not accessed to newly obtain the apparatus information, and the apparatus information retained by the visual display controller is returned.

FIG. 5 is an operation timing chart of a server device as a comparative example.

The operating condition in the operation timing chart of FIG. 5 is the same as the operating condition in the operation timing chart of FIG. 4 except that a primary session is not distinguished from a non-primary session.

In the case of the server device of FIG. 5 as a comparative example, the apparatus H/W is accessed to newly obtain the apparatus information in response to the status display request transmitted from any of the Web clients A-D.

If FIG. 4 is compared with FIG. 5, it should be apparent in the case of FIG. 4 that the apparatus H/W is not newly accessed for a non-primary session, and thus the load for obtaining the apparatus information is greatly reduced.

In the description above, in cases where there are several types of state monitoring screens, it was assumed that a primary session was set for each of the several types of state monitoring screens. However, a primary session may be set for a portion of these several types of state monitoring screens. For example, only the first-displayed state monitoring screen for monitoring a state of the server device may be processed in the way of FIGS. 3 and 4 where there are a primary session and a non-primary session. It is often the case that the first-displayed state monitoring screen is displayed on the Web clients A-D for a long time, and thus the load on the server device will be greatly reduced even if only the first-displayed state monitoring screen is processed as above. If the load on the server device is reduced, available throughput increases, and thus for example, it is possible to increase the number of the Web clients that can be simultaneously connected. Moreover, the amount of the reduced load may be allocated to the original task of the server device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus coupled to a plurality of terminal devices through a communication channel, the information processing apparatus comprising:
a communication unit configured to communicate with the plurality of terminal devices;
an apparatus information obtaining unit configured to obtain apparatus information indicating a state of the information processing apparatus; and
an information transmission controller which includes an information storage unit configured to store the apparatus information received from the apparatus information obtaining unit, wherein,
when the communication unit receives a first information transmission request repeatedly transmitted from a first terminal device which transmitted the first information transmission request for requesting transmission of the apparatus information displayed on a first state monitoring screen among the plurality of terminal devices, the information transmission controller requests the apparatus information obtaining unit to obtain the apparatus information corresponding to the first information transmission request, receives the apparatus information from the apparatus information obtaining unit, stores the obtained apparatus information in the information storage unit, and controls the communication unit to transmit the apparatus information to the first terminal device, and
after the communication unit receives the first information transmission request transmitted by another terminal device other than the first terminal device among the plurality of terminal devices, the information transmission controller controls the communication unit to transmit the apparatus information corresponding to the first information transmission request stored in the information storage unit to the another terminal device.

2. The information processing apparatus according to claim 1, wherein
after another information transmission request other than the first information transmission request is transmitted from the first terminal device,
when the communication unit receives the first information transmission request from a new first terminal device that subsequently transmits the first information transmission request, the information transmission controller requests the apparatus information obtaining unit to obtain apparatus information corresponding to the first information transmission request, receives the apparatus information from the apparatus information obtaining unit to store the apparatus information in the information storage unit, and controls the communication unit to transmit the apparatus information to the new first terminal device, and
when the communication unit receives the first information transmission request transmitted by another terminal device other than the new first terminal device among the plurality of terminal devices, the information transmission controller controls the communication unit to transmit apparatus information corresponding to the first information transmission request, which is stored in the information storage unit, to the another terminal device.

3. The information processing apparatus according to claim 1, wherein
the first state monitoring screen includes at least a state monitoring screen displayed first on each of the plurality of terminal devices for monitoring a state of the information processing apparatus.

4. The information processing apparatus according to claim 1, wherein
the information transmission controller converts the apparatus information received from the apparatus information obtaining unit into screen information that indicates a screen on which the apparatus information is displayed, and stores the screen information in the information storage unit, and
when the communication unit receives an information transmission request from the terminal device, the information transmission controller controls the communication unit to transmit the screen information.

5. A method for controlling transmission from an information processing apparatus to a plurality of terminal devices performed in an information processing apparatus coupled to the plurality of terminal devices through a communication channel, the information processing apparatus including a communication unit configured to communicate with the plurality of terminal devices, an apparatus information obtaining unit configured to obtain apparatus information indicating a state of the information processing apparatus, and an information storage unit configured to store the apparatus information received from the apparatus information obtaining unit, the method comprising:
when the communication unit receives a first information transmission request repeatedly transmitted from a first terminal device which transmitted the first information transmission request for requesting transmission of the apparatus information displayed on a first state monitoring screen among the plurality of terminal devices, requesting the apparatus information obtaining unit to obtain the apparatus information corresponding to the first information transmission request, receiving the apparatus information from the apparatus information obtaining unit, storing the obtained apparatus information in the information storage unit, and controlling the communication unit to transmit the apparatus information to the first terminal device; and
after the communication unit receives the first information transmission request transmitted by another terminal device other than the first terminal device among the plurality of terminal devices, controlling the communication unit to transmit the apparatus information corresponding to the first information transmission request stored in the information storage unit to the another terminal device.

6. The method according to claim 5, further comprising:
after another information transmission request other than the first information transmission request is transmitted from the first terminal device,
when the communication unit receives the first information transmission request from a new first terminal device that subsequently transmits the first information transmission request, requesting the apparatus information obtaining unit to obtain apparatus information corresponding to the first information transmission request, receiving the apparatus information from the apparatus information obtaining unit to store the apparatus information in the information storage unit, and controlling the communication unit to transmit the apparatus information to the new first terminal device; and when the communication unit receives the first information transmission request transmitted by another terminal device other than the new first terminal device among the plurality of terminal devices, controlling the communication unit to transmit apparatus information corresponding to the first information transmission request, which is stored in the information storage unit, to the another terminal device.

7. The method according to claim 5, wherein
the first state monitoring screen includes at least a state monitoring screen displayed first on each of the plurality of terminal devices for monitoring a state of the information processing apparatus.

8. The method according to claim 5, wherein
the apparatus information received from the apparatus information obtaining unit is converted into screen information that indicates a screen on which the apparatus information is displayed and then the screen information is stored in the information storage unit, and
when the communication unit receives an information transmission request from the terminal device, the communication unit is controlled to transmit the screen information.

* * * * *